Patented May 17, 1949

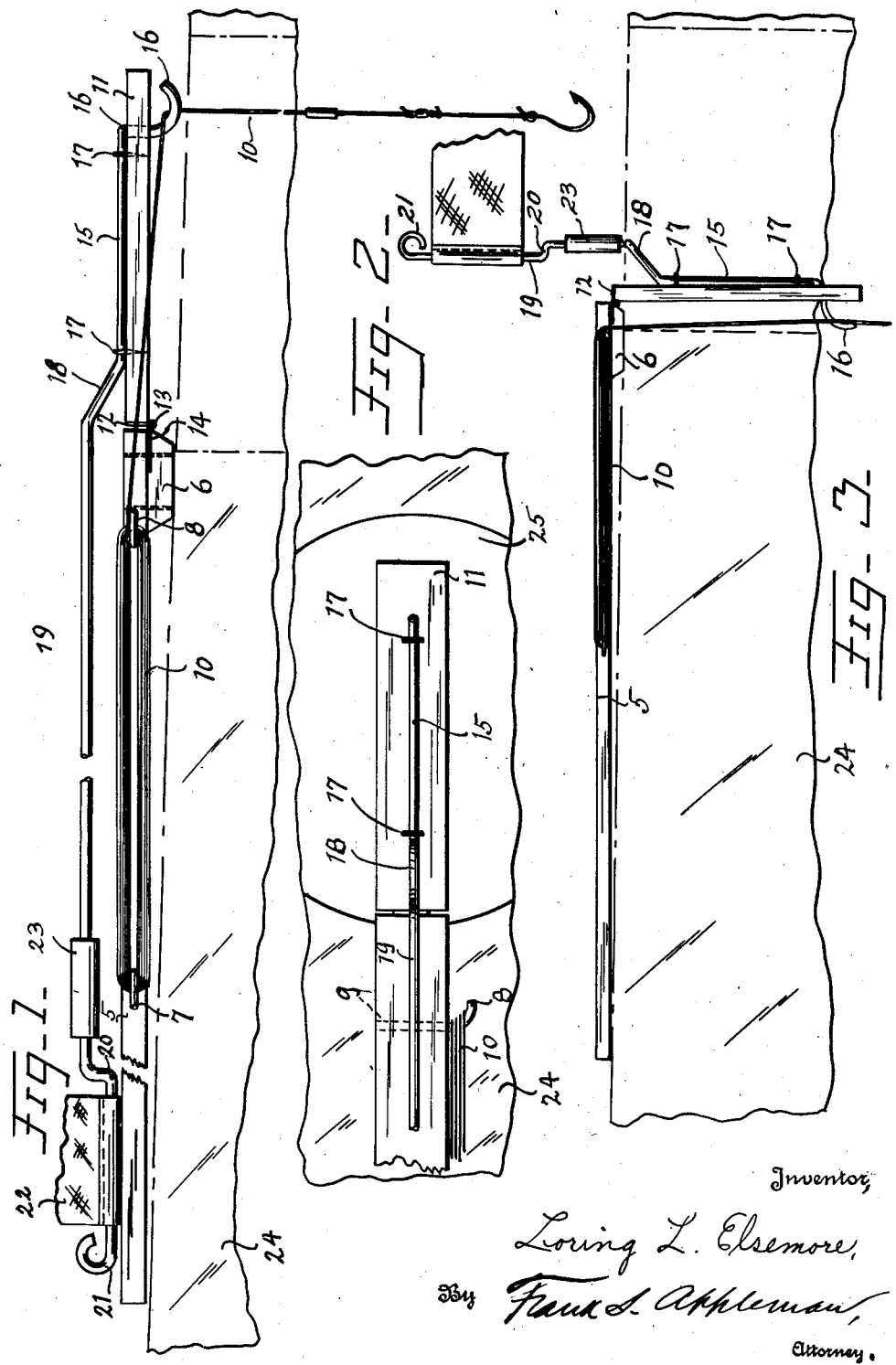

2,470,610

UNITED STATES PATENT OFFICE 2,470,610

ICE FISHING JACK

Loring L. Elsemore, Bangor, Maine

Application December 26, 1946, Serial No. 718,450

2 Claims. (Cl. 43—17)

This invention relates to ice fishing jacks, and particularly to a device having novel means for holding a signaling flagstaff collapsed when a fishing line is set for fishing, means being provided by which, upon pull on the line, as by the striking of a fish, the flagstaff will be moved to vertical position for exposing the flag or signal; novel means being provided by which the said staff is retained in said vertical position, and specifically, the means for holding the flagstaff collapsed or elevated comprises a weight which automatically moves from the outer end of the flagstaff to a position where gravity maintains the signal in an upright position.

It is a further object of this invention to provide a fishing jack of the character indicated, having means for holding a coiled fishing line, which line can be readily removed therefrom in appropriate length for the depth of the water in which the fishing activities occur; and it is furthermore the purpose of the inventor to provide a member movable with the main body of the fishing jack, permitting it to swing vertically under the influence of a pull on the line operating over a guide on said movable member, it being understood that the flagstaff having novel construction is secured thereto so that it moves from a horizontal to an approximately vertical position during its operation.

It is a still further object of this invention to provide a fishing jack comprising few, inexpensive parts which have proven efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in side elevation of the fishing jack and accompanying parts in the initial position before its operation;

Figure 2 illustrates a plan view of a fragment of the said jack and accompanying parts; and Figure 3 illustrates a side elevation, showing the positions of the parts when the signal has been actuated or moved by a pull on the fishing line.

In these drawings 5 denotes the body of the fishing jack which preferably comprises an elongated element, preferably of wood, and at its inner end the said member 5 is supplied with a stop block 6 secured thereon in appropriate manner. The body 5 of the jack is provided with spaced line-engaging and holding elements 7 and 8 which may be in the nature of hooks with shanks 9 embedded in the edge of the said body, and the line 10 may be wrapped across the space between the members 7 and 8 and stored on said members 7 and 8, as is obvious. A member 11 comprising a length of material, preferably of wood, has the leaf 12 of a hinge 13 connected to it, and the other leaf 14 of the hinge is secured to the body 5, preferably between said body and the stop block 6. A flagstaff is secured to the member 11 and it comprises a length of material, such as wire, having a straight portion 15 which is anchored to the member 11, and an end 16 of said material or wire extends through the member 11 and has a hooked end which forms a guide for the line 10 which is applied thereto as the line is set for fishing. The straight portion 15 of the shaft is secured to the member 11 by appropriate anchoring means 17, such as staples or the like, and the said material of the staff is offset to form a shoulder 18, and there is an extended straight portion 19 of the staff which is shaped to form another shoulder 20 near its end 21, and a suitable flag or signal 22 is secured on the staff beyond the shoulder 20.

A tubular weight or sleeve 23 is slidable on the straight portion 19 of the staff between the shoulders 18 and 20 and is arrested in its movement by the shoulder 18 when the staff is moved into a vertical position, as when a pull on the line 10 moving on the guide 16 depresses the outer end of the member 11 and elevates the flagstaff, for, in so doing, the weight 23 slides downwardly to the zone of the pivot where the weight holds the flag elevated until the signal is re-set.

In the illustration, the foundation 24 on which the equipment is set is ice formation and a hole 25 is cut in the ice as a clearance for the movement of the member 11 to the position in which it is shown in Fig. 3, it being understood that the body portion is supported on the ice with the hinge 13 at approximately the edge of the hole in the ice.

I claim:

1. In a fishing jack, a body member, line-holding elements at the edge of said body, a member pivotally connected to the said body, a flagstaff secured to the upper surface of said member, said flagstaff having spaced shoulders between its ends, a signal on the outer end of said staff, a weight slidable on the said staff between the shoulders, and a guide for a fishing line on the outer end of said member whereby pull on the fishing line swings said member to a vertical position and changes the position of the flagstaff.

2. A fishing jack in accordance with claim 1 in which the guide for the fishing line on the outer end of the member is integral with the flagstaff whose end extends at an angle through the said member and terminates in a hook forming the said guide.

LORING L. ELSEMORE.

REFERENCES CITED

The following references are of record in the file of this patent:

UNITED STATES PATENTS

| Number | Name | Date |
| --- | --- | --- |
| 962,420 | Dibbles | June 28, 1910 |
| 1,406,038 | Larsen | Feb. 7, 1922 |
| 1,808,736 | Hernke | June 2, 1931 |
| 2,136,864 | Paquette | Nov. 15, 1938 |